United States Patent [19]
Rydningen

[11] Patent Number: 6,100,986
[45] Date of Patent: *Aug. 8, 2000

[54] ARRANGEMENT FOR OPTIC MEASURING OF BOTH WIDTH AND THICKNESS OF AN OBJECT MOVING ALONG A STRAIGHT PATH

[76] Inventor: Toni Rydningen, Kalstadhaven 10, N-3770, Kragerø, Norway

[*] Notice: This patent is subject to a terminal disclaimer.

[21] Appl. No.: 08/545,670

[22] PCT Filed: Apr. 15, 1994

[86] PCT No.: PCT/NO94/00076

§ 371 Date: Dec. 29, 1995

§ 102(e) Date: Dec. 29, 1995

[87] PCT Pub. No.: WO94/24516

PCT Pub. Date: Oct. 27, 1994

[30] Foreign Application Priority Data

Apr. 19, 1993 [NO] Norway ...................................... 931430

[51] Int. Cl.⁷ .................................................. G01B 11/00
[52] U.S. Cl. ...................................... 356/386; 250/559.25
[58] Field of Search .................................. 356/381, 384, 356/385, 386, 387; 250/559.24, 559.25, 559.27; 348/88

[56] References Cited

U.S. PATENT DOCUMENTS 3,187,185  6/1965  Milnes ....................................... 356/381
4,179,707 12/1979  Sjödin ................................. 250/559.25
5,325,178  6/1994  Louis et al. ............................. 356/385

FOREIGN PATENT DOCUMENTS 152987   9/1985  Norway .
168271  10/1991  Norway .
210166   1/1967  Sweden .
382865   2/1976  Sweden .
449136   4/1987  Sweden .

*Primary Examiner*—Richard A. Rosenberger
*Attorney, Agent, or Firm*—Andrus, Sceales, Starke & Sawall

[57] ABSTRACT

A device for touchless measuring of thickness and width of an object travelling along a straight path, based on the use of CCD video camera and laser. The device, by means of installed cameras, laser(s) and two parabola-shaped mirrors, measures both thickness and width of an object as the center line thereof passes directly below the width measuring camera. The device is intended to be coupled to a computer or PC or PLS. Communicating equipment does not become "stuck", occupied with reading measuring values even if the object to be measured comes to rest within the measuring area. Parabola-shaped mirrors are mounted parallel in the longitudinal direction, and with the concave and mirror-coated sides angled 90° to each other in the plane of the short sides, (short dimensions); further, these are positioned with the longitudinal direction parallel with the transport direction of the object to be measured and above the same, such that light and contrast transitions are mirrored in these and recorded by the camera. The device may be used for e.g. measuring thickness and width of laterally conveyed timber in adjusting works.

7 Claims, 2 Drawing Sheets

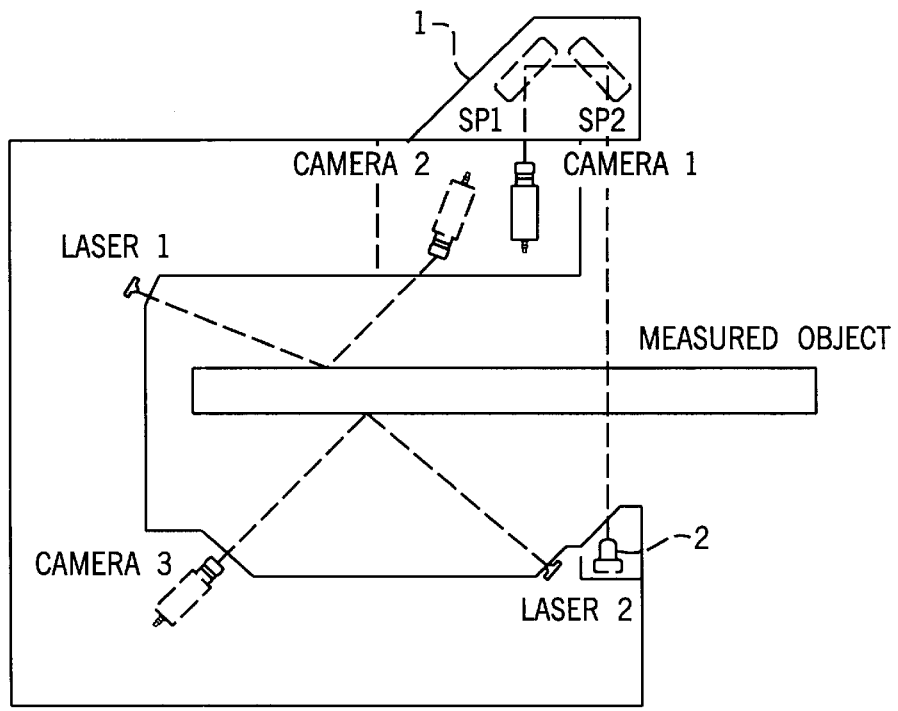
FIG. 1
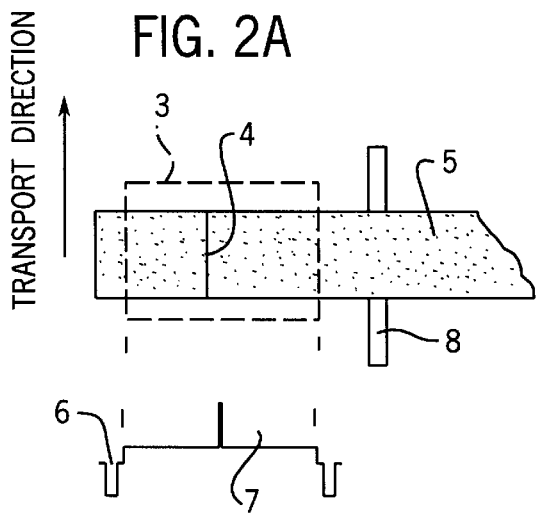
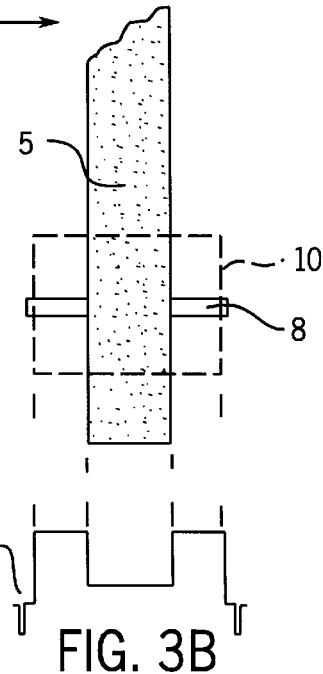

ARRANGEMENT FOR OPTIC MEASURING OF BOTH WIDTH AND THICKNESS OF AN OBJECT MOVING ALONG A STRAIGHT PATH

BACKGROUND OF THE INVENTION

Brief Summary of the Invention

The present invention relates to a device for contactless measuring of both width and thickness of an object moving along a straight path.

The invention could be used for measuring thickness and width of e.g. laterally conveyed wood and timber at an adjustment works.

For a long time, it has been desirable to have a compact solution for contactless measuring of both thickness and width simultaneously, and such that the measuring results could be passed further on to a PLS, a computer or a PC. Rotating objects or sensors touching the object to be measured have, in the long term, been found to cause larger or smaller inconveniences. Some pulse generators used for width measurements have been inclined to transmit pulses due to even small vibrations in the equipment to which the pulse generator is mounted, the measurements being activated by e.g. photoelectric cells. This problem is largest in those cases wherein a plank during measuring has been at rest in the area of measuring for some longer time. Another problem has been that the dull-edge on the wood/timber could contribute to erroneous measurements of both width and thickness. In an attempt to avoid erroneous measuring of the thickness, several values have been receipted by a computer. Subsequently, one uses the largest value.

This invention solves these problems by means of a single unit measuring both width and thickness touchlessly, and without any movable or rotating parts being included. Measuring both width and thickness takes place only at that moment the central line of the plank or object to be measured passes the centre of the measuring area of the camera. When the camera sees the front edge of the object to be measured, an internal search for the central line of the object to be measured starts. At the moment this is detected, the measuring is carried out. The measuring values are laid out in the order width, thickness 1 and thickness 2. The system initializes itself as soon as the object to be measured is out of the visual field of the camera.

The dull-edge problems illustrated in FIG. 4 are eliminated in that the CCD camera 11 in FIG. 5 used for the width measurement sees "around the corner" of the wood/timber piece 12 by means of a parabola-shaped mirror 1.

In order that the device is to function according to its intention, the width measurement, as shown in FIG. 1, requires camera 1, two parabola-shaped mirrors sp1 and sp2 as well as an elongated light source 2. For the thickness measurement, at least camera 2 and laser 1 are required. In those cases wherein one can not use a safe and sufficiently accurate lower edge reference, one has to use camera 3 and laser 2. For both thickness and width measurement, some electronics for converting the analog video signals to TTL levels is required, and further to digitize the values measured and lay these out to a communication gate, such that they can be fetched by a computer, PLS or PC.

From Norwegian patent NO 152,987 a system for measuring the diameter of logs is known, by means of light from a light source illuminating a parabolic mirror. From the mirror, the light is reflected toward the object to be measured. On the basis of the shadow portion of the object formed on a detector, the diameter is found. Use of parabolic mirrors and lights must be considered known on the basis of said patent. However, it is important to note that, in accordance with FIG. 3 of said patent specification, a power driven rotating plane mirror is used, and that one parabolic mirror only is used in order to carry out the measurement. When FIG. 4 of the patent specification shows two such mirrors, forming 90° with each other in the longitudinal direction, this is because the measurement in the figure shown is carried out in two directions, and that these two measuring directions are turned 90° in relation to each other.

The purpose of using parabola-shaped mirrors is, in addition to what has been mentioned in the preceding section, that objects having a given dimension, here width, shall not give differing measuring result when the distance to the object to be measured, or such as in this case, the thickness, varies.

Norwegian Patent No B 168,271 shows a device for optical measurement of elongated objects, such as sawn pieces of timber. The device comprises a camera, image processing devices and a mirror for reflecting the image of the object. According to the laying-out publication, the mirror may have different forms. However, it is not mentioned that the mirror necessarily has to be parabola-shaped and concave. It is obvious that the intention with the invention is to contract the image of an elongated object more in the longitudinal direction than in the lateral direction of the object, such that either the length only or both width and length of the object simultaneously are measurable by means of one and the same camera which scans the surface of the mirror.

The novel and particular feature of this invention as shown in FIG. 1 is in addition to measuring both width and thickness and carrying out the measurement at a defined moment when the central line of the object to be measured passes the centre of the measuring area, also that it—in order to measure the width—uses two parabola-shaped mirrors together with one CCD camera, in such a combination that one simultaneously avoids deviation of measuring values in that the object to be measured comes closer to the camera as well as avoids the use of a motor having plane mirrors or prisms which rotate. The camera which, in order to come away from the measuring zone of its own, looks obliquely into one of the mirrors, searches along a straight line in the longitudinal direction of the mirror. However, the camera will, based on the positioning thereof, in the mirror see a curved picture of an otherwise straight line. The consequence would be that the camera searching in a straight line, would sense only a small part of the image of the straight line. I.a., this is in order to counteract this unfortunate consequence that a mirror No. 2, which otherwise is quite equal to the first mirror, is mounted such that the concave sides of the two mirrors become turned 90° relative to each other in the plane of the short sides (short dimensions). The fact that the angled positioning is in the plane of the short sides, is of substantial importance for this invention. A further and important feature is that the individual components may be mounted so close to each other that they may be assembled in a closed dust-tight cabinet having a narrow, elongated, transparent aperture only, thereby facilitating the cleaning.

BRIEF DESCRIPTION OF THE SEVERAL VIEWS OF THE DRAWING

FIG. 1 is a side view of the optical measuring arrangement;

FIGS. 2A and 2B show schematically the operation of the arrangement in measuring the thickness of an object;

FIGS. 3A and 3B show schematically the operation of the arrangement in measuring the width of an object;

DETAILED DESCRIPTION OF THE INVENTION

Figure 4:
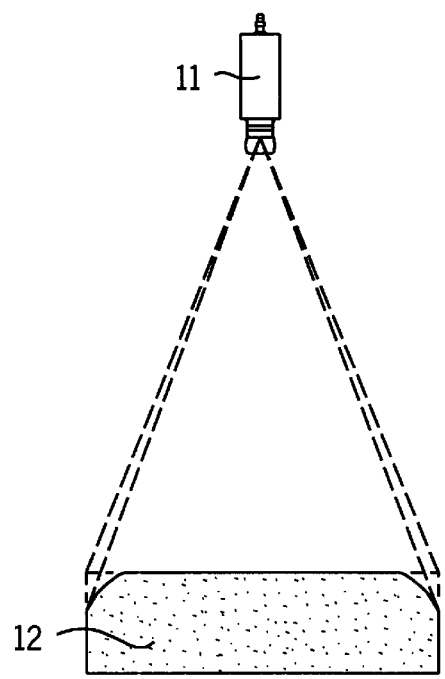
FIG. 4 illustrates the dull-edge problem of the prior art.

The technical mode of operation is based on the use of cameras, lasers, a light source as well as parabola-shaped mirrors as shown in FIG. 1.

Camera 2 and camera 3 as well as laser 1 and laser 2 measure the thickness, camera 1 measuring the width through the two parabola-shaped mirrors sp1 and sp2 mounted in the top portion of the thickness and width measuring device. Parabola-shaped mirrors sp1 and sp2 extend in a direction parallel to the direction of movement of the object to be measured, i.e. into the plane of the paper in FIG. 1. As noted above, the concave sides of parabola-shaped mirrors face each other and the mirrors, when viewed as in FIG. 1, lie at an angle of 90° to each other to apply the light from light source 2 to the viewing field of camera 1. The scanning lines of the viewing field of camera 1 are searchable in a direction parallel to the transport direction for the measured object, as shown in FIGS. 3A and 3B.

Installed electronics digitizes the video information from the cameras. Each time an object to be measured passes the thickness and width measuring device, the binary number representation for thickness and width is laid out to a communication gate.

The Thickness Measurement:

FIG. 2 shows how the thickness is measured. The dotted line 3 frames the area seen by the camera 2. In the course of the camera's horizontal line search No. 150, the camera will see the reflected beams 4 from laser 1. The visual field of camera 2 has scanning lines searchable in a direction normal to the transport direction for the measured object, as shown in FIGS. 2A and 2B. The pulse (7) thus originating on the video signal becomes TTL converted. A counter indicates the length between the line drop and this signal pulse caused by the laser light.

As the laser light in FIG. 1 has an acute incident angle toward the object to be measured and from the direction shown, the counting length will become larger the thicker the object to be measured passing the measuring device is. The thickness is measured at the moment the object to be measured passes the centre of the vertical searching field of camera 2. The passage of the central line is detected by the width measuring device. The thickness measured by the camera 2 is, in relation to the base upon which the object to be measured rests, in propulsion.

It is necessary to install camera 3 and laser 2 only in those cases where the height level of the lower edge of the object to be measured can be expected to vary.

The Width Measuring:

FIG. 3 shows how the width of the object 5 to be measured is measured by means of camera No. 1. The dotted line 10 shows the visual field of this camera. Lowermost in the figure, video information (9) on search line No. 150 is shown as the object 5 to be measured passes. Contrary to the thickness measurement, the line search in this case does not take place 90° relative to the direction of motion of the object to be measured, but rather in the same direction.

Without the camera seeing an object to be measured, the light from the elongated light source 8 will enter camera 1 through the two parabola-shaped mirrors sp1 and sp2 in FIG. 1 and, thus, cause the video information to become saturated (receive maximum amplitude) across the entire area of searching of line No. 150. When, on the other hand, an object to be measured enters the visual field of camera 1 such as shown in FIG. 3A, the voltage level of the video signal (9) will drop as shown in this FIG. 3B, and be low across the portion of the line laid in the dark by the object to be measured. A counter is activated such that it runs in the time during which the video signal is low. The counted value existing at the output of line No. 154 will, for each new sub image, be overwritten unless the central line (the centre of the width of the object) of the object to be measured has passed in the centre of the horizontal visual field of the camera. This being the case, the last counted value will not be overwritten. Camera 2 and camera 3 measuring the thickness, will be processed subsequently. The values for these cameras will then, in succession after the width value from camera 1, be laid out to the communication gate together with a "data valid" value, which is the value 1, 2 or 3, dependent on whether the value to be transferred is the value of width, thickness 1 or thickness 2.

Resetting of the values on the communication gate takes place at the moment a new object to be measured enters into the visual field of the camera on one of the lines from 148 to 154. Also, the resetting signal removes the "data valid" signal.

The parabola-shaped mirror contributes to the ability of the camera to "see past the corner" of the object to be measured.

Figure 5:
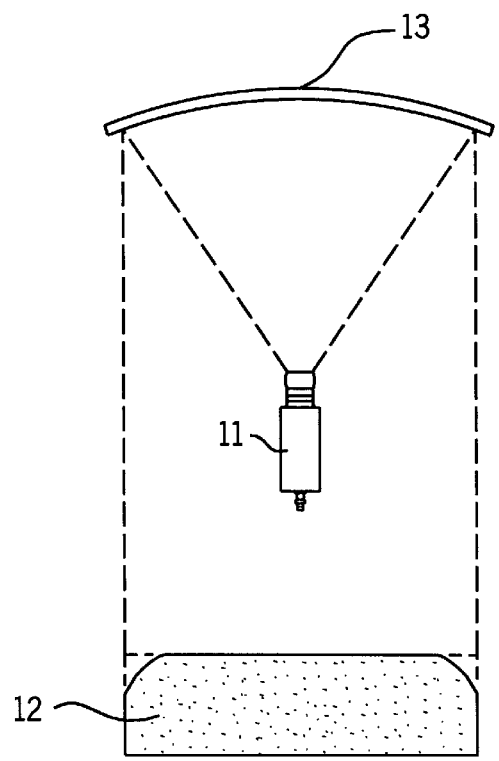
FIG. 5 shows the manner in which the present invention overcomes the dull-edge problem.

In this way, one avoids the misleading measuring results otherwise originating because of dull-edge when measuring wood and timber. See FIGS. 4 and 5.

What is claimed is:

1. A device for measuring the width dimension of an object which moves relative to the device along a transport direction, the width dimension of the object lying parallel to the transport direction, said device comprising:

a light source generating elongated beam of light parallel to the transport direction, which beam of light is intercepted by the object to be measured during the relative movement of the device and object;

a video camera having a viewing field containing a plurality of scanning lines searchable in a direction parallel to the transport direction;

mirror means for applying the beam of light to the visual field of the camera, said mirror means comprising first and second concave, parabolic mirrors, the parabolic shape of the mirrors having a focal axis, the focal axes of the first and second parabolic mirrors lying normal to the transport direction and in a common plane, said first parabolic mirror being spaced from said light generating source so that the object to be measured intercepts the beam of light between the light generating source and the first parabolic mirror, said first and second parabolic mirrors being arranged such that the concavities of said mirrors are facing each other and so that the focal axes of the mirrors are lying at an angle of 90° to each other, said second parabolic mirror receiving light beam reflected from said first parabolic mirror and applying it to the viewing field of said video camera so that the amount of blocking of the beam of light by the object to be measured may be sensed by searching a scanning line of the viewing field; and means coupled to said video camera for determining the width of the object to be measured from the amount of blocking of the beam of light by the object.

2. The device as claimed in claim 1 further defined as a device for measuring the thickness of the object to be measured, the thickness dimension extending between a pair of surfaces of said object and said dimension lying parallel to the path of the beam of light between said light source and said first parabolic mirror, said device further comprising:

a second light source applying a second beam of light to one of said surfaces of said object to be measured, said light being applied at an angle to said surface, said light beam being applied normal to the direction of transport of the object to be measured; and a second video camera having a viewing field containing a plurality of scanning lines searchable in a direction normal to the transport direction, said video camera receiving the second light beam as reflected from said surface of the object to be measured; and wherein said determining means is further defined as means for determining the thickness of the object to be measured from the position of the reflected light beam from said surface of the object to be measured in the viewing field of said video camera as sensed by searching a scanning line of the viewing field.

3. The measuring device according to claim 2 wherein said determining means is further defined as including a counter for determining the location of the reflected light beam in the visual field from the timing of the occurrence of a pulse resulting from the sensing of the reflected light beam by the video camera.

4. The device according to claim 2 wherein said determining means is further defined as determining whether the center of the width of the object has passed the center of the visual field of said video camera and for establishing the width determination as valid if the center of the width of the object has passed the center of the visual field of said video camera, and wherein said determining means is further defined as establishing the determined thickness as valid immediately subsequent to the passage of the center of the width of the object past the center of the visual field of said video camera.

5. The measuring device according to claim 1 wherein said determining means is further defined as including a counter for determining the amount of blockage of the elongated beam of light by the object to be measured from the searching of a scanning line of the viewing field.

6. The device according to claim 1 wherein said determining means is further defined as determining whether the center of the width of the object has passed the center of the visual field of said video camera and for establishing the width determination as valid if the center of the width of the object has passed the center of the visual field of said video camera.

7. The device according to claim 1 wherein at least said video camera and said parabolic mirrors are mounted in dust tight enclosure means.

* * * * *